Oct. 7, 1930.  M. OTRZASEK  1,777,765

MAGNETIC STEEL SLIVER MEAT SCRAPER

Filed March 2, 1929

INVENTOR
Mike Otrzasek
his Attorney

Patented Oct. 7, 1930

1,777,765

UNITED STATES PATENT OFFICE

MIKE OTRZASEK, OF ROSEDALE STATION, ALBERTA, CANADA

MAGNETIC STEEL-SLIVER MEAT SCRAPER

Application filed March 2, 1929. Serial No. 343,956.

This present invention has relation to new and useful improvements in a magnetic steel sliver meat scraper and has for its primary object the provision of a simple implement which may be readily passed over meat to remove therefrom steel slivers and the like which are frequently found in meat which has been cut with a saw, a knife, or the like and may not be readily observed with the naked eye but nevertheless will tend to injure the person eating the meat.

Another object of the invention resides in the provision of an implement of the character stated which may be readily employed in the home or at the butcher shop to remove steel slivers and the like from the cut of meat before preparing the same for cooking and eating.

A further object of the invention resides in the provision of an implement of the character stated including a magnetic member having serrated blades or saw blades extended across the same to detect and remove steel slivers and the like from the meat as the implement is passed over the surface of the meat, without injury to the meat.

A still further object of the invention resides in the provision of a magnetic steel sliver meat scraper of the character stated which is of extremely simple construction, composed of the minimum number of parts and arranged so that the back plate of the device may be readily removed from the handle and other parts for cleaning the implement after use of the same on the meat and thus provide for removal of the slivers from the implement and a thorough cleaning of the latter ready for further use.

The invention has for a still further object the provision of a magnetic steel sliver meat scraper of the character stated in which the various parts are readily assembled and held together during use of the implement and may be readily separated and cleaned, as desired.

To the accomplishment of these and related objects as shall become apparent as the description proceeds, my invention resides in the construction, combination and arrangement of parts as shall be hereinafter more fully described, illustrated in the accompanying drawings and pointed out in the claims hereunto appended.

The invention will be best understood and can be more clearly described when reference is had to the drawings, forming a part of this disclosure, wherein like characters indicate like parts, throughout the several views.

In the drawings:—

Figure 1:
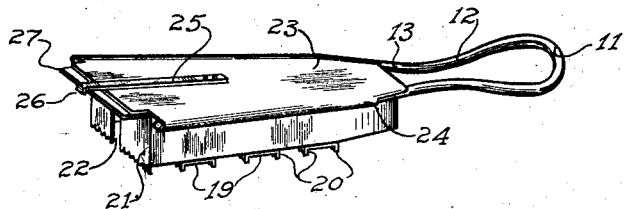
Figure 1 is a perspective view of the magnetic steel sliver meat scraper.
Figure 2:
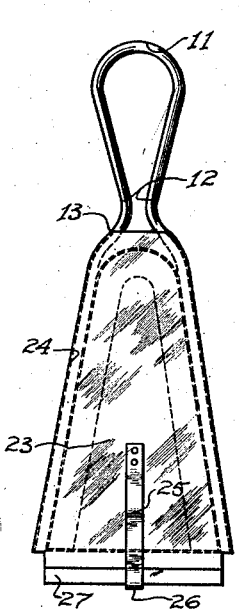
Figure 2 is a top plan view of the scraper.
Figure 3:
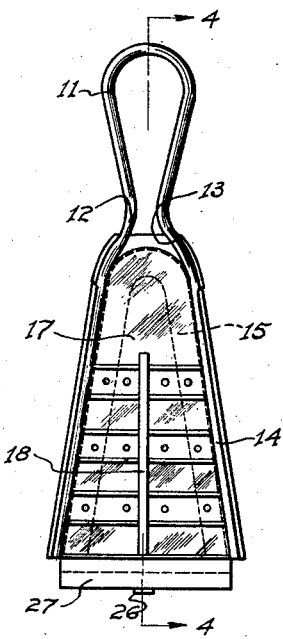
Figure 3 is a bottom plan view thereof.
Figure 4:
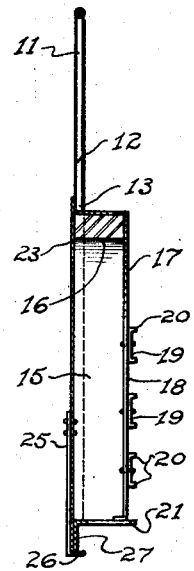
Figure 4 is a longitudinal section through the scraper, taken substantially on the plane of line 4—4 of Figure 3, looking in the direction indicated by the arrows.
Figure 5:
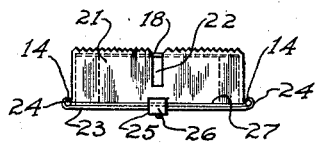
Figure 5 is an end elevation, looking at the rear end thereof.

Referring more in detail to the drawings, it is to be noted that a wire handle 11 is formed from a section of wire bent centrally upon itself so that the bight portion of the wire forms the handle 11, the sides of which are slightly converged forwardly to form the narrow neck 12 at the forward end of the handle, after which the legs of the wire are curved outwardly to form the pair of shoulders 13 from which the legs of the wire diverge to form the frame sides 14 of the implement. A magnet 15 of substantially conventional form is held between the wire frame sides 14 with its bight portion 16 held in the shoulders 13. A bottom plate 17 is mounted on the underface of the magnet 15 and is provided with a central longitudinal slot 18 extending inwardly from the forward end of the plate 17 for the greater portion of the length thereof. A plurality of channel plates 19 are mounted transversely on the bottom plate 17, to either side of the slot 18 and on the underface of the plate 17 with their downturned longitudinal edges serrated to form scraping blades 20 for scraping the surface of the meat and extract therefrom all steel slivers and similar particles, the magnet 15 influencing the plate 17 and the channel plates 19, so that the extracted steel slivers and the like are firmly held and removed by the scraper blades 20. An additional scraper blade 21 is also provided across the forward end of the magnet 15 and has its serrated upper edge in the same plane as the serrated upper edges of the scraper blades 20, to assure thorough cooperation of the scraper blade 21 with the scraper blades 20. It is also to be noted that the scraper blade 21, has a central slot 22 registering with the central slot 18 of the bottom plate 17. A top plate 23 is also provided for covering over the magnet 15. The top plate tapers or decreases in width toward its rear end to correspond with the shape of the body of the implement and the longitudinal edges 24 of the top plate 23 are rolled under for clamping engagement around the wire frame sides 14. A spring latch plate 25 is secured by its rear end on the top plate 23 and has its extended forward end 26 bent down at an angle for engagement over the out-turned upper edge 27 of the scraper blade 21, to hold the top plate 23 firmly in position until the spring latch 25 is released from the out-turned edge 27 of the scraper blade 21 to permit withdrawal of the top plate 23 rearwardly from the body of the implement.

As the construction of the device has thus been described in detail, brief reference is now had to its use and modus operandi: It is to be noted that the top plate 23 may be readily placed in position and held firmly against movement during use of the implement. By passing the implement over the surface of the meat, the scraper blades 20 and 21 will be caused to agitate the surface and expose and extract all steel slivers and the like caught up by or deposited in the meat during cutting or sawing thereof. It is thus apparent that the meat will be thoroughly cleaned of deposits which may cause injury to the persons eating the meat and when left in the meat may be the cause of appendicitis, peritonitis, cancer or other serious trouble, sometimes developing very slowly. After use of the implement the particles gathered thereby and passing through the slot 18, into the body of the implement may be readily removed and the implement thoroughly cleaned by taking off the top plate 23. This top plate 23 may be again readily secured in position on the body of the implement to close the top thereof, after thorough cleaning of the parts of the implement.

From the foregoing description taken in connection with the accompanying drawings, it will be manifest that a magnetic steel sliver meat scraper is provided that will fulfill all the necessary requirements of such a device but as many changes could be made in the above description and many apparently widely different embodiments of my invention may be constructed within the scope of the appended claims without departing from the spirit or scope thereof, it is intended that all matters contained in the said accompanying specification and drawings, shall be interpreted as illustrative and not in a limited sense.

Having thus described my invention, what I claim as new and desire to secure by Letters Patent is:

1. A magnetic steel sliver meat scraper including a magnet; scraper blades supported across said magnet; removable covering means for said magnet; and a handle for the scraper.

2. A magnetic steel sliver meat scraper including a magnet; transversely extending scraper blades mounted across said magnet; a covering member for said magnet; and a handle for the scraper.

3. A magnetic steel sliver meat scraper including a magnet; a plate supported on said magnet and having a central slot; scraper blades extended transversely across said plate on opposite sides of said slot; a removable cover plate for the other side of said magnet; and a handle extended from one end of the magnet of the scraper.

4. A magnetic steel sliver meat scraper including a magnet; a plate mounted on said magnet and having a central slot; transverse scraper blades mounted on said plates; a frame extended along the sides of said magnet; a handle extended from one end of said frame; a top plate removably mounted on said frame; and means for releasably retaining said top plate in position.

5. A magnetic steel sliver meat scraper including a body and a handle formed therewith; a magnet supported in said body; a bottom plate carried on said magnet and mounted; transverse scraper blades extended across the solid portions of said bottom plate for gathering the steel slivers from meat when the scraper is passed over the surface of the meat; a top plate removably supported on said body; and a spring clamp for removably securing said top plate in position.

In testimony whereof I hereunto affix my signature.

MIKE OTRZASEK.